United States Patent
Kashyap (10) Patent No.: US 7,843,915 B2
(45) Date of Patent: Nov. 30, 2010

(54) PACKET FILTERING BY APPLYING FILTER RULES TO A PACKET BYTESTREAM

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 11/832,234

(22) Filed: Aug. 1, 2007

(65) Prior Publication Data

US 2009/0034519 A1 Feb. 5, 2009

(51) Int. Cl.
*H04L 12/28* (2006.01)
(52) U.S. Cl. .................................. 370/389; 726/13
(58) Field of Classification Search .............. 370/389, 370/235; 726/13
See application file for complete search history.

(56) References Cited

U.S. PATENT DOCUMENTS

| | | | | |
|---|---|---|---|---|
| 5,606,668 | A * | 2/1997 | Shwed | 726/13 |
| 6,996,070 | B2 * | 2/2006 | Starr et al. | 370/252 |
| 7,293,113 | B1 * | 11/2007 | Krishna et al. | 709/250 |
| 7,440,405 | B2 * | 10/2008 | Hsieh et al. | 370/235 |
| 7,480,312 | B2 * | 1/2009 | Ossman | 370/469 |
| 2004/0042487 | A1 | 3/2004 | Ossman | |
| 2005/0021558 | A1 * | 1/2005 | Beverly et al. | 707/104.1 |
| 2006/0098653 | A1 * | 5/2006 | Adams et al. | 370/389 |
| 2006/0206300 | A1 * | 9/2006 | Garg et al. | 703/27 |
| 2007/0083924 | A1 * | 4/2007 | Lu | 726/13 |
| 2008/0155676 | A1 * | 6/2008 | Johnson et al. | 726/13 |
| 2008/0240140 | A1 * | 10/2008 | Dabagh et al. | 370/412 |

\* cited by examiner

*Primary Examiner*—Ian N Moore
*Assistant Examiner*—Matthew Hopkins
(74) *Attorney, Agent, or Firm*—Steven Bennett; Kevin P. Radigan; Heslin Rothenberg Farley & Mesiti P.C.

(57) ABSTRACT

A packet filtering method, system and article of manufacture are provided which include: employing an instruction set associated with a pseudo-machine in filtering packets received at a network interface card coupled to a host, wherein a set of instructions of the instruction set implements at least one byte-defined filter rule; and the employing includes for a packet of the received packets, processing bytes of the packet as a bytestream and applying at least one filter rule to the bytestream to filter the packet. The applying can be performed in any one of a plurality of locations without customization of the instruction set, including the network interface card and the host processor coupled thereto.

19 Claims, 5 Drawing Sheets

PACKET FILTERING BY APPLYING FILTER RULES TO A PACKET BYTESTREAM

TECHNICAL FIELD

The present invention relates in general to network processing environments, and more particularly, to a packet filtering method, system and article of manufacture which employs a generic instruction set implementable without customization in any one of a plurality of locations, including a host system and one or more associated network interface cards.

BACKGROUND OF THE INVENTION

Computers communicate over a network using the TCP/IP protocol (or, much less commonly, other protocols). Specifically, such computers communicate by transmitting information in TCP/IP packets onto the network, and by receiving information in TCP/IP packets from the network. TCP and IP protocols are complex. In conventional computer architecture, the host processor (e.g., the central processing unit (CPU)) may expend a considerable amount of processing power to perform the TCP/IP protocol processing.

Devices called TCP Offload Engines (TOE) have therefore been developed. A TOE is a technology for acceleration of TCP/IP by moving TCP/IP processing to a separate dedicated controller off the main host processor. This separate dedicated controller is often realized on extension cards called network interface cards (NIC). A NIC card that includes a type of TOE device is sometimes called an intelligent network interface card (iNIC).

A TOE or other network processor offload typically partially or completely replicates the host processor's network stack. Unfortunately, generic network filtering (for example, as a component of a firewall), cannot be applied across a system wherein one or more of the host processors employs a NIC(s) with TOE(s) or other network offload(s) since each of the offload mechanisms might be different, as well as their interfaces. Conventionally, the same network filter solution cannot be applied across multiple locations within such a system, but rather, customization per implementation location is needed in order to employ a network filter.

SUMMARY OF THE INVENTION

The shortcomings of the prior art are overcome and additional advantages are provided through the provision of a packet filtering method. The method includes: employing an instruction set associated with a pseudo-machine in filtering packets received via a network interface card coupled to a host, wherein the instruction set is generic, and a set of instructions of the instruction set implements at least one filter rule, the employing including; obtaining a packet of the received packets for filtering; and processing bytes of the packet as a bytestream and applying the at least one filter rule to the bytestream to filter the packet, wherein filtering the packet comprises one of accepting the packet, accepting the packet with modification or discarding the packet, and wherein the applying is performed in any one of a plurality of locations without customization of the generic instruction set.

In a further aspect, the plurality of locations include the network interface card and the host coupled thereto. When employed in the network interface card, the network interface card further includes at least one of an offload engine or firewall filtering. Advantageously, the method can be implemented in an environment where the network interface card and the host include different interfaces employing different interface types.

In further aspects, the processing and applying follow performing at least one of a frame check sequence (FCS) check on the packet and a filtering on a medium-access control (MAC) for the packet, wherein if the packet fails the FCS check or MAC filter, the packet is discarded prior to processing of the packet as the bytestream and applying of the at least one filter rule. Further, processing of the packet as a bytestream can include dividing the packet into octets starting with a media header of the packet. The at least one filter rule may compare a octet in the bytestream against at least one of another octet in the bytestream or a constant value. In addition, the processing and applying may be performed in a first network interface card coupled to the host for packets received at the first network interface card, and at the host for packets received at a second network interface card coupled to the host, wherein the second network interface card lacks the packet filtering facility.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The concepts presented herein are generally applicable to filtering packets in any one of various computing environment configurations, including environments with one or more network interface cards coupled to a host system wherein one or more of the network interface cards comprise a TCP offload engine (TOE) or other type of offload processing which partially or completely replicates the host's network stack. One problem within such an environment is that conventional network filtering cannot be applied across such a system (i.e., at different locations within the system), since each of the filtering mechanisms might be different.

Figure 1:
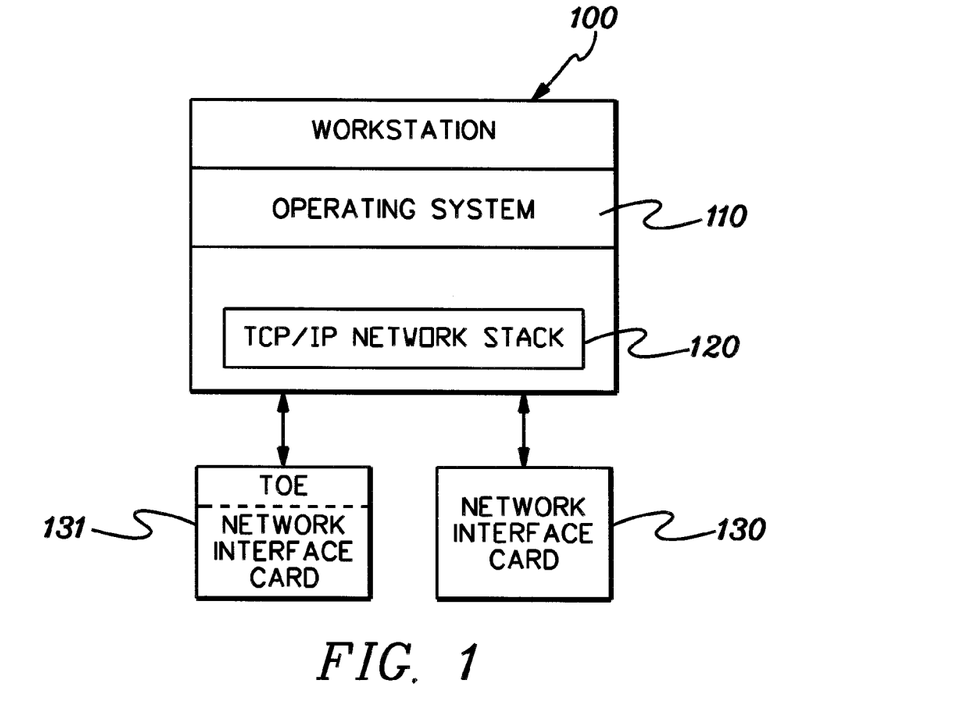
FIG. 1 depicts one embodiment of a processing environment to incorporate and use one or more aspects of the present invention.

FIG. 1 depicts one embodiment of a computing environment to incorporate and use one or more aspects of the present invention. This computing environment includes a computing unit which in this example is a workstation 100 executing an operating system 110, such as Windows NT® or LINUX®. ("Windows NT" is a registered trademark of Microsoft Corporation, of Redmond, Wash., and "LINUX" is a trademark of Linus Torvalds.) Alternatively, workstation 100 may comprise an RISC® workstation offered by International Business Machines Corporation, running an AIX® operating system. ("RISC" and "AIX" are registered trademarks of International Business Machines Corporation of Armonk, N.Y.) Workstation 100 is one computing unit of a plurality of computing or processing units (not shown) coupled to one another via one or more connections, such as, wire connections, wireless connections, or any type of network connection, such as a local area network (LAN), a wide area network (WAN), a token ring, an Ethernet connection, etc.

By way of example only, and without limitation to the claimed subject matter, communication between the computing units may employ TCP/IP protocol. This protocol uses a TCP/IP network stack 120 on the host (e.g., workstation 100) and packets are exchanged across the network via one or more network interface cards (NICs) 130, 131 coupled to the host. In this example, network interface card 130 is assumed to comprise a conventional network interface card, while network interface card 131 includes a TCP offload engine (TOE).

As noted, within a computing environment such as shown in FIG. 1, conventional firewall network filtering cannot be generically applied at different locations because the network interface cards 130, 131 and host processor often have different interfaces and processing abilities. For example, if the host has one firewall filtering approach and the NIC another, then it is likely that the NIC specifies filter rules in NIC specific registers or programming interface, while the host specifies the same rules as per its software implementation (e.g., netfilter/iptables in Linux). This is a problem since the NIC typically does not support the host specified software rules. Thus, to implement a firewall filter, it is typically necessary to specially configure the filter for the particular computing unit and/or network interface card.

In one aspect, therefore, presented herein is a method, system and article of manufacture to perform generic packet filtering in a computing environment such as depicted in FIG. 1. More particularly, presented herein are techniques to offload packet filtering, for example, to a network interface card in a stateless manner, thereby reducing CPU overhead and reducing unnecessary processing of packets that may otherwise be discarded after filtering. Furthermore, a network filter technique is presented herein which is usable in conjunction with TOEs.

Generally stated, a packet filtering technique is presented which includes employing a generic instruction set in filtering packets received at a network interface card coupled to a host computer at any one of a plurality of locations. The plurality of locations include the network interface card itself, and the host coupled thereto. When employed within the network interface card, the network interface card may further include an offload engine, or other firewall filtering.

In one aspect, the packet filtering approach presented herein treats a received packet of data as a raw bytestream, and applies one or more byte-based rules to process one or more bytes of the packet bytestream. Advantageously, this generic state machine can be implemented in a network interface card comprising a TOE, at the host processor, or in any one of various other locations, such as a network interface card having firewall filtering.

Figure 2:
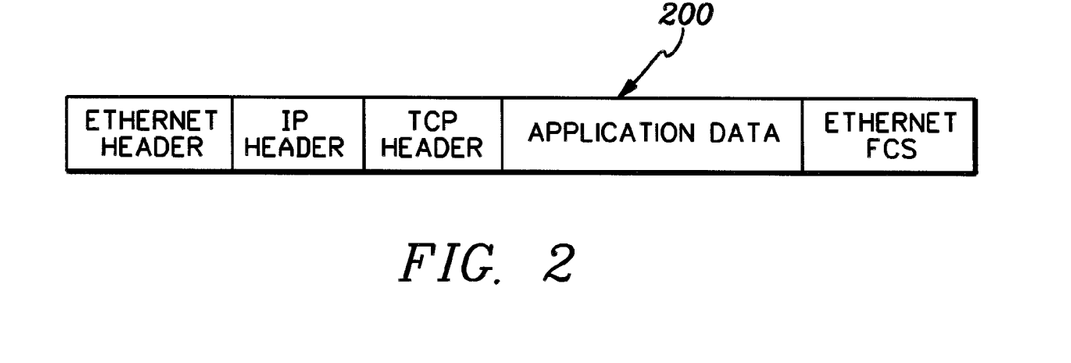
FIG. 2 depicts one embodiment of an Ethernet packet to be filtered, in accordance with an aspect of the present invention.

FIG. 2 depicts one embodiment of an Ethernet packet 200 to undergo filtering employing a network filter, in accordance with an aspect of the present invention. Notwithstanding the separation into header and data fields, packet 200 is viewed herein as a series of octets, or bytes. For example, Ethernet packet 200 may comprise up to 1500 bytes when viewed as a raw bytestream or a sequence of octets. As noted, in accordance with an aspect of the present invention, the entire packet 200 is considered a raw bytestream against which one or more rules are applied (that is, the packet is processed by the filter implemented for a pseudo-machine), e.g., within a TOE of an NIC, at the host processor, or within an NIC performing firewall filtering, etc.

Figure 3:
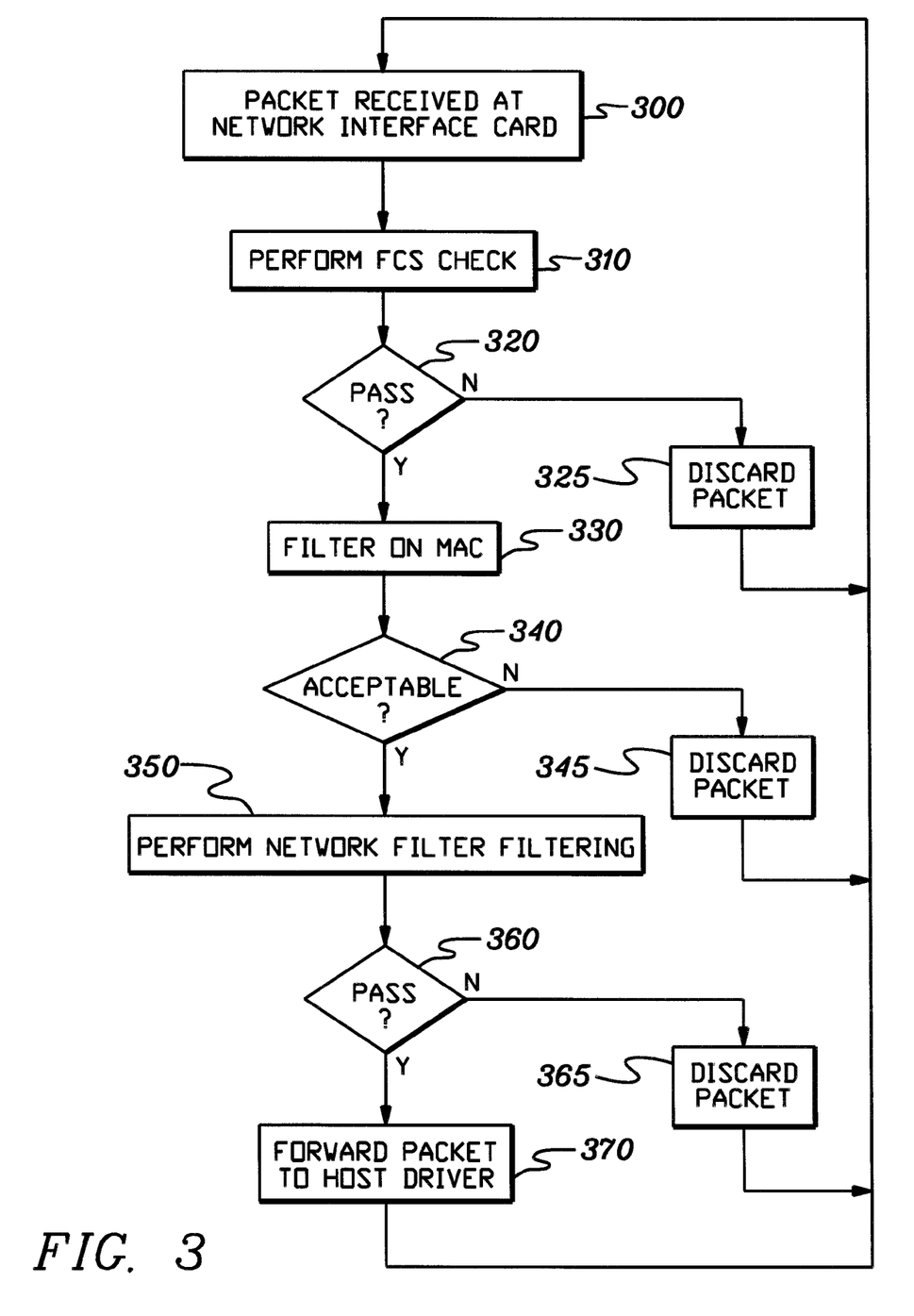
FIG. 3 depicts one embodiment of logic for processing a packet at a network interface card, in accordance with an aspect of the present invention.

FIG. 3 depicts one embodiment of logic for processing a packet at a network interface card, including implementing network filter filtering. By way of example, this logic assumes that the network filtering is implemented within a NIC coupled to a computing unit such as depicted in FIG. 1. A packet is received at the network interface card 300 and conventional frame check sequence (FCS) filtering is performed on the packet 310. The logic determines whether the packet passes the FCS check 320. If "no", then the packet is discarded 325 and processing loops back to process a next received packet. If "yes", then the logic accepts the packet if the medium-access control (MAC) 330 matches the interface's address or a multicast/broadcast address supported by the interface 340. If "no", the packet is discarded 345. Otherwise, network filter filtering 350, in accordance with an aspect of the disclosure, is performed.

Network filter filtering processes a packet as a raw bytestream of data and then applies one or more byte-defined filter rules to the packet bytestream, which completes the filtering process. By way of example, processing a packet as a bytestream can include dividing the packet into octets starting with the media header (e.g., Ethernet header) of the packet.

Figure 3A:
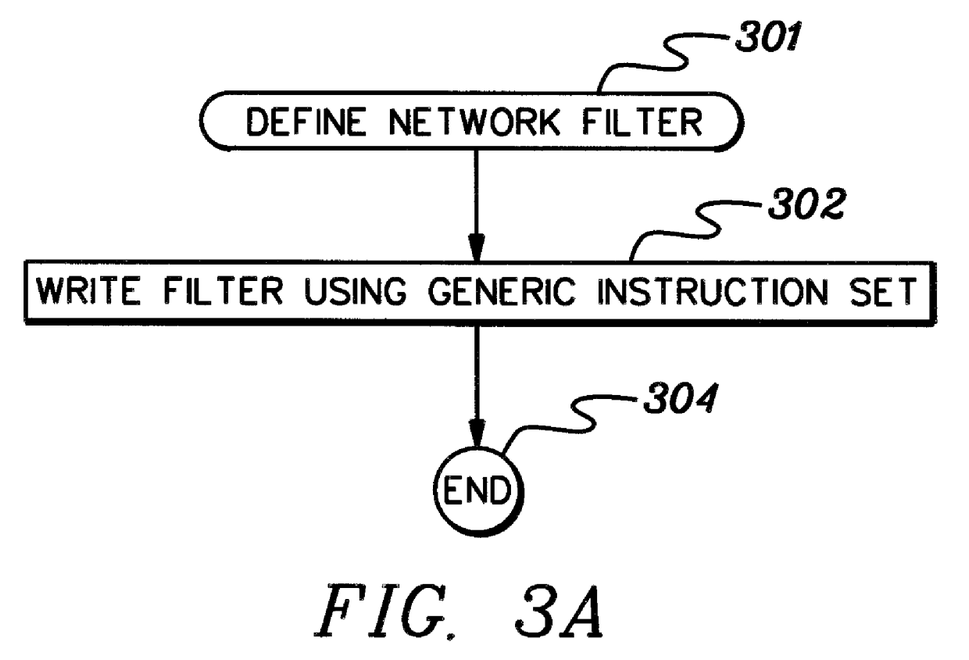
FIG. 3A depicts one embodiment of logic for specifying a network filter, in accordance with an aspect of the present invention.

FIG. 3A depicts one embodiment for defining or specifying a network filter 301, in accordance with an aspect of this disclosure. A network filter can be predefined prior to receipt of a packet by implementing the filter in a set of instructions using a generic instruction set associated with the pseudo-machine 302. This completes 304 definition of the network filter.

It is proposed that a pseudo or virtual machine is defined with a set of registers, scratch memory, instruction pointer, index register, etc. An instruction set is associated with this virtual machine. A filter rule is then written as a program in the virtual machine instruction set. Since the same virtual machine is implemented in the host (possibly in software), and in the NICs (TOE or filter offload), the filter rules can be reliably and consistently enforced across the NICs.

By way of example, the filter rule may be to compare the $40^{th}$ octet (starting from the preamble) against a constant. If the comparison returns false then the packet is accepted. Assume that the network filter state machine has two registers. In such a case, the rule might be encoded as: load byte #40 in register A, and load a constant value to compare against in register B. Thereafter, the two values are compared, and the result placed in register A. If the comparison is "true", then the packet may be dropped, while if "false", the packet may be accepted. The drop/accept could also have certain modify instructions associated with it.

By way of further explanation, the following detailed example is provided. It should be noted that this is just an example, since a state machine may be defined with an alternative set of registers and instructions as well. First, a description of how the bytestream and its contents are accessed is provided. The conventional Ethernet packet is of the following format:

| Preamble (7 bytes) | Start Frame Delimiter (1 byte) | Dest MAC (6 bytes) | Source MAC (6 bytes) | Length/Type (2 bytes) | Data... | Pad... | Frame Check Sequence (4 bytes) |
|---|---|---|---|---|---|---|---|

Therefore, every octet or byte of the packet may be referred to as an index into the packet. For example: DS[8] implies the $8^{th}$ byte (starting from 0). In the above packet stream it would imply the Destination MAC address. Since the address is 6 bytes long, one needs to compare all 6 bytes for a match. Therefore, one can refer to that as:

DS[8:6]

This instruction means look at 6 octets starting at the $8^{th}$ octet. However, having to specify exact offsets and sizes in some cases can be circumvented by using "named indexes". The implementation would need to understand these indices and convert them to the specific offsets and sizes. The following describes that the data stream (packet) should be considered an Ethernet packet, and we want to lookup the Destination MAC Address. This is always at byte offset 8, therefore, the implementation can be encoded to translate the named index "Dest_MAC" to offset 8. The term "ETHERNET" describes the format of the Data stream to use when translating the "Named index".

DS {ETHERNET: Dest_MAC}

If the $0^{th}$ bit at octet 8 is to be specified, then the format is: DS[8.0]. Similarly, DS[8.5] implies the 5th (counting from 0) bit of the 8th octet.

A filter rule looks at one or more values contained in the packet and compares the values against a set of rules. Then it either accepts or rejects the packet. Alternatively, a filter rule may modify a packet's content by overwriting certain octets.

Note that this is an example machine, but that one could create any machine using the concepts disclosed herein that meets the requirements. One aspect of the present disclosure is to provide a common machine that is implementable in the host, on the NICs and offload-engines such that a given rule is implemented in the same way in all setups removing any differences in rule deployment.

The byte-defined filter machine presented herein may be considered as having a stack of registers (e.g., 3 registers, A, B and C), a memory for temporary storage of data and some instructions. An example set of instructions may be:

LOAD <value>; where the value is a numeric value and is loaded into register A. Contents of register A are pushed to register B. B's to C.

LOAD DS[ ]; as above except the noted bytes of the data stream are loaded as described above LOAD M[x]; load from memory location 'x'

CMP; compare value in register A with register B and store result in A

JMP x; jump to instruction at label 'x' if content of register A is FALSE

STORE DS[ ]; To modify the content of the data stream or packet

ACCEPT; the packet is accepted and passed to the next role and if the last rule then for protocol processing REJECT; the packet is dropped There could be other instructions as well.

An example of a rule is:

if TCP packet and for port 80 then drop

This can be translated as follows (relying on the macro TCP. This implies that the implementation will add in instructions to access the TCP header).

```
Start:
       LOAD DS {TCP:port}
       LOAD 80
       CMP
       JMP end
       ACCEPT
end:
       REJECT
```

The macro TCP itself would involve similar assembly that would first determine the Ethernet packet's Ethertype (lenght field) to be 0x800 (for IP for example) or 0x86DD (IPv6). Then look at the IP packet and determine the protocol it contains. If TCP, skip over IP's header (using header length field) and access the TCP header. Then look for the port and load it.

Returning to FIG. 3, after performing network filter filtering 350, the logic determines whether the packet passes 360. If "no", then the packet is discarded 365 at the network interface card. If "yes", then the packet is forwarded to the host driver 370.

Those skilled in the art will note from the above description that presented herein is an approach for implementing generic network filtering, even when different types of network interface cards are employed with a host processor.

Figure 4:
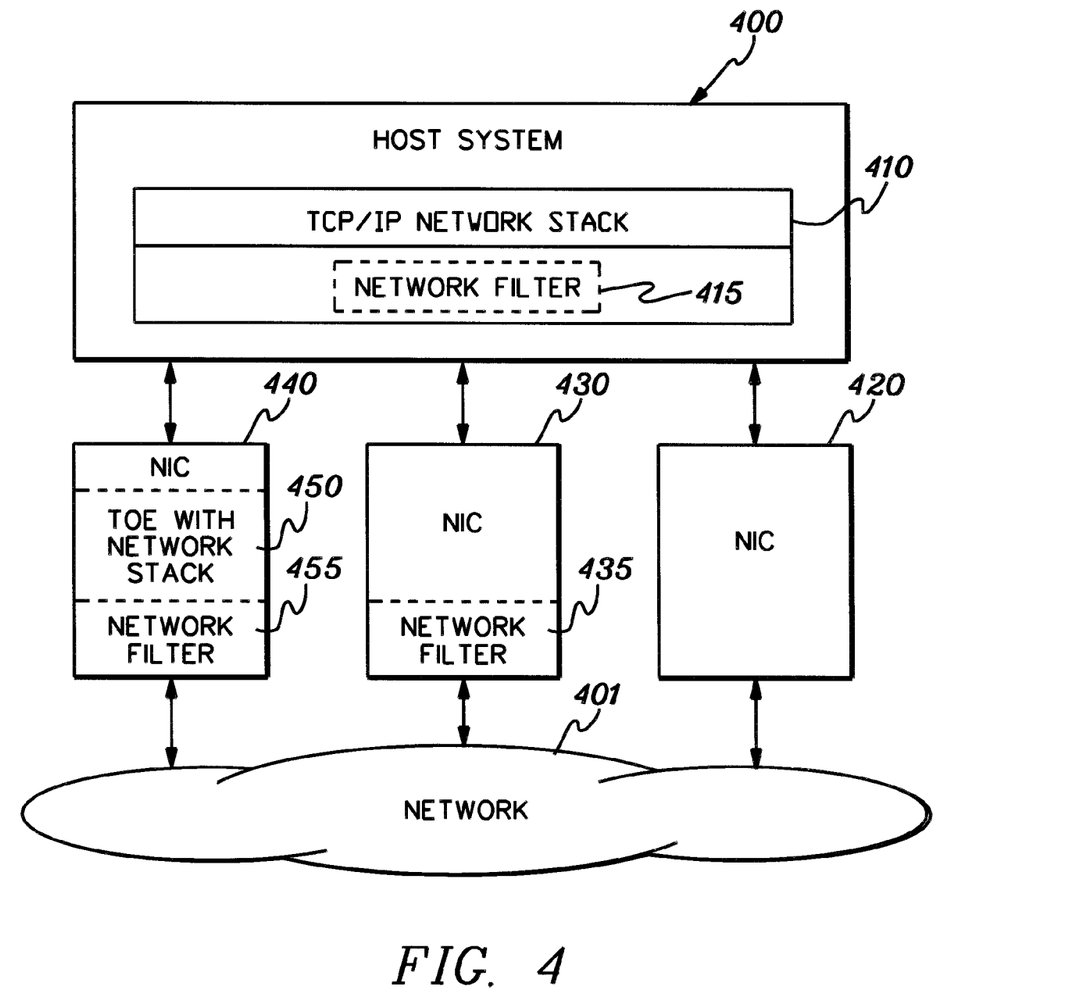
FIG. 4 depicts one embodiment of a processing environment incorporating and using network filter filtering in one or more of a plurality of locations without customization thereof, in accordance with an aspect of the present invention.

As shown in FIG. 4, the network filter processing 415 could be implemented within a host 400, and more particularly, in association with a TCP/IP network stack 410 thereof. Alternatively, a network filter 455 could be implemented within a network interface card (NIC) 440 comprising a TOE with a network stack 450, or as a network filter 435 of a NIC 430 employing firewall filtering. If the filtering disclosed herein is implemented within a host as network filter 415, then a conventional network interface card 420 may be employed. In the example of FIG. 4, the various network interface cards 420, 430 & 440 communicate across a network with one or more other processing units (not shown).

Numerous enhancements on the above-described concepts can be implemented. For example, the network filter might be extended to recognize fields or octets within a bytestream defined by LABELS for well known protocols (e.g., a TCP header or a UDP header), and then indexing from those LABELS. This would allow special extensions to filter internet small computer system interface (ISCSI) data or network file system (NFS) data. As used herein, "LABEL" means an extension or a predefined macro of the filter language wherein the use of, for example, LABEL TCP, implies find the beginning of a TCP header, rather than actually describing how to determine where the TCP header is in the raw packet bytestream.

As noted in the above example, a TCP packet comprises the link-layer frame (Ethernet frame), IP, TCP headers followed by the data. The filtering of packets may be implemented by different vendors differently. Furthermore, within the same system, a TOE network interface card and the OS may implement filtering differently, causing ambiguity and inconsistencies. Disclosed hereinabove is a concept wherein each packet is redefined as a bytestream to which a pre-specified filter machine is applied. The filter machine understands a set of instructions that enable described filtering actions (e.g., based on comparison, checks and any such combination of the packet's fields or bytes). The actions may be: accept the packet, drop the packet, or accept and modify one or more fields or bytes in the packet bytestream. More complicated actions may also be employed.

With the concepts disclosed herein, a standardized filter language can be employed in the host's operating system, in the TOE, or even in NICs extended for the filtering function. This allows a common technique for implementing a filter in a computing environment which supports TOE and/or filter-enhanced NICs. The network filter offloading allows firewall filtering (as in LINUX's iptables/netfilter) to be done on the network interface card. Advantageously, the inclusion of the network filter machine (e.g., a network filter Virtual Machine) on the NICs, TOE, ISCSI/RDMA devices allows these devices to be used with non-offload NICs in a seamless manner on the same host processing unit.

One or more aspects of the present invention can be included in an article of manufacture (e.g., one or more computer program products) having, for instance, computer useable media. The media has therein, for instance, computer readable program code means of logic (e.g., instructions, code, commands, etc.) to provide and facilitate the capabilities of the present invention. The article of manufacture can be included as a part of a computer system or sold separately.

Figure 5:
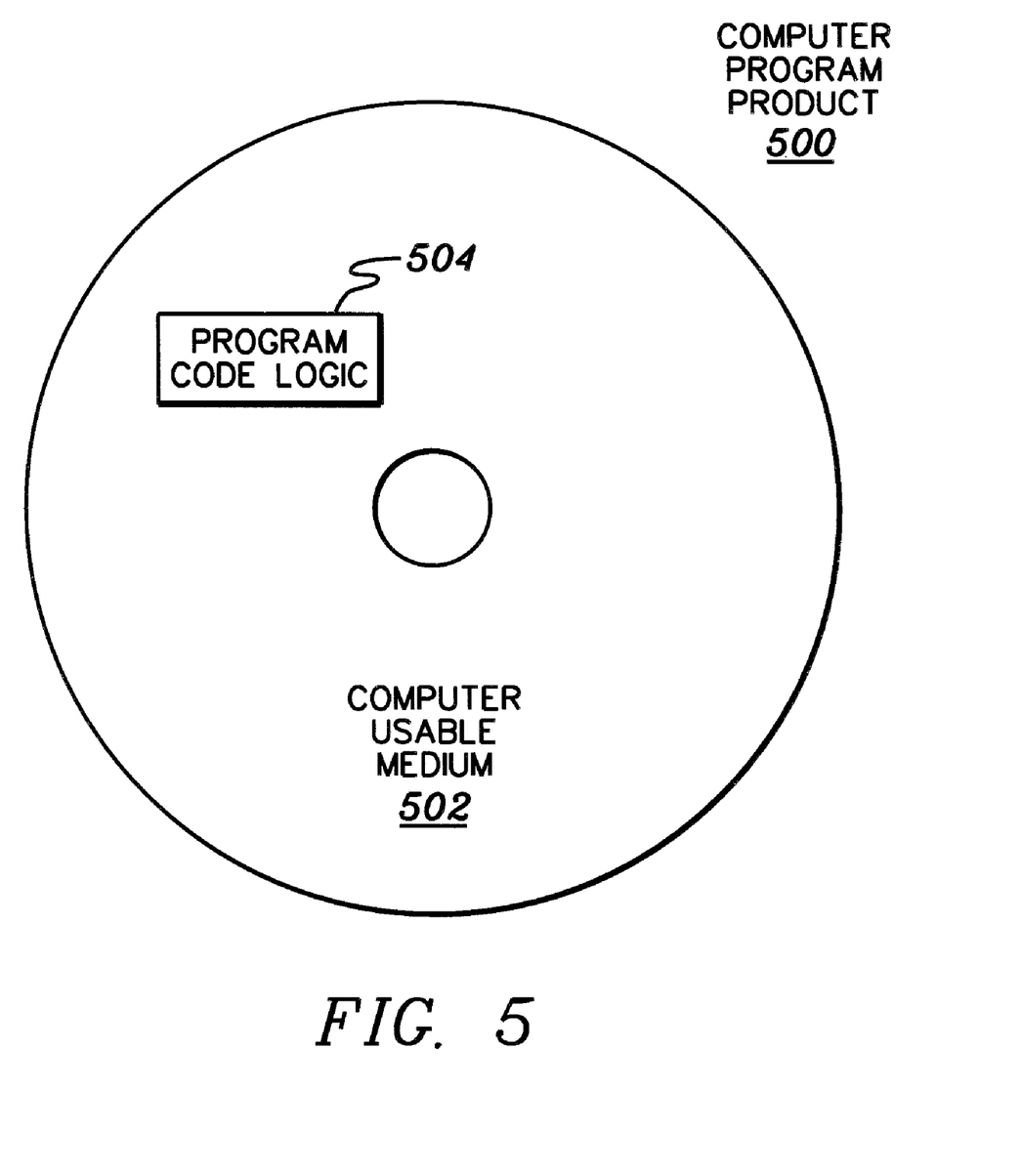
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer readable storage devices 502 to store computer readable program code means or logic 504 thereon to provide and facilitate one or more aspects of the present invention. Examples of a computer readable storage device include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Input/Output or I/O devices (including, but not limited to, keyboards, displays, pointing devices, etc.) can be coupled to the system either directly or through intervening I/O controllers. Network adapters are coupled to the system to enable the processing system to be coupled to other processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A packet filtering method comprising:
   filtering packets received via a network interface card coupled to a host employing an instruction set of a pseudo-machine, the pseudo-machine being a generic state machine implementable in any of a plurality of locations, wherein the instruction set is generic, a set of instructions of the instruction set of the pseudo-machine being written as a discrete program which when executing performs the filtering to apply at least one filter rule, wherein the set of instructions is independent of the location in which the pseudo-machine is implemented, the filtering comprising:
   obtaining a packet of the received packets for filtering;
   processing bytes of the packet as a bytestream and executing the set of instructions to apply the at least one filter rule to the bytestream to filter the packet, wherein filtering the packet comprises one of accepting the packet, accepting the packet with modification, or discarding the packet, and wherein the executing is performed in any one of a plurality of locations without customization of the generic instruction set, and the pseudo-machine is implementable in any one of the plurality of locations without customization of the generic instruction set, the plurality of locations comprising the network interface card and the host, and the at least one filter rule is implemented the same across any of the plurality of locations; and
   wherein the processing and executing are performed in a first network interface card coupled to the host for packets received at the first network interface card, and wherein a second network interface card is also coupled to the host, the second network interface card lacking the pseudo-machine, and wherein the processing and executing are performed at the host for packets received at the second network interface card.

2. The method of claim 1, wherein the processing and executing follow performing at least one of a frame check sequence (FCS) check on the packet and a filtering on a medium-access control (MAC) for the packet, wherein if the packet fails the FCS check or MAC filter, the packet is discarded prior to processing of the packet as the bytestream and executing the set of instructions to apply the at least one filter rule.

3. The method of claim 1, wherein the at least one filter rule comprises at least one byte-defined filter rule.

4. The method of claim 1, wherein the processing of packet as a bytestream comprises processing the packet as a raw bytestream by dividing the packet into octets and executing the set of instructions to apply the at least one filter rule to the octets of the raw bytestream.

5. The method of claim 1, wherein the at least one filter rule compares a byte in the bytestream against at least one of another byte in the bytestream or a constant value.

6. A packet filtering method comprising:
  filtering packets received via a network interface card coupled to a host employing an instruction set of a pseudo-machine, the pseudo-machine being a generic state machine implementable in any of a plurality of locations, wherein the instruction set is generic, a set of instructions of the instruction set of the pseudo-machine being written as a discrete program which when executing performs the filtering to apply at least one filter rule, wherein the set of instructions is independent of the location in which the pseudo-machine is implemented, the filtering comprising:
  obtaining a packet of the received packets for filtering;
  processing bytes of the packet as a bytestream and executing the set of instructions to apply the at least one filter rule to the bytestream to filter the packet, wherein filtering the packet comprises one of accepting the packet, accepting the packet with modification, or discarding the packet, and wherein the executing is performed in any one of a plurality of locations without customization of the generic instruction set, and the pseudo-machine is implementable in any one of the plurality of locations without customization of the generic instruction set, and the at least one filter rule is implemented the same across any of the plurality of locations, the plurality of locations comprising the network interface card and the host coupled thereto, and wherein when employed in the network interface card, the network interface card further comprises at least one of an offload engine or firewall filtering; and
  wherein the processing and executing are performed in a first network interface card coupled to the host for packets received at the first network interface card, and wherein a second network interface card is also coupled to the host, the second network interface card lacking the pseudo-machine, and wherein the processing and executing are performed at the host for packets received at the second network interface card.

7. The method of claim 6, wherein the program implements a generic state machine, the generic state machine comprising the at least one filter rule in machine language and processing the packet as a raw bytestream by dividing the packet into octets and executing the set of instructions to apply the at least one filter rule to the octets of the raw bytestream.

8. The method of claim 6, wherein the network interface card and the host comprise different interfaces employing different interface types.

9. A packet filtering system comprising:
  a network interface card coupled to a host;
  an instruction set of a pseudo-machine, the pseudo-machine being a generic state machine implementable in any of a plurality of locations, the instruction set being generic and comprising a set of instructions for filtering packets received at the network interface card coupled to the host, the set of instructions of the pseudo-machine being written as a discrete program which when executing performs the filtering to apply at least one filter rule, wherein the set of instructions is independent of the location in which the pseudo-machine is implemented;
  logic adapted to process bytes of a packet of the received packets as a bytestream and to execute the set of instructions to apply the at least one filter rule to the bytestream to filter the packet, wherein the logic is implemented in any one of a plurality of locations without customization of the generic instruction set, and the pseudo-machine is implementable in any one of the plurality of locations without customization of the generic instruction set, the plurality of locations comprising the network interface card and the host, and the at least one filter rule is implemented the same across any of the plurality of locations; and
  wherein the processing and executing are performed in a first network interface card coupled to the host for packets received at the first network interface card, and wherein a second network interface card is also coupled to the host, the second network interface card lacking the pseudo-machine, and wherein the processing and executing are performed at the host for packets received at the second network interface card.

10. The system of claim 9, wherein when employed in the network interface card, the network interface card further comprises at least one of an offload engine or firewall filtering.

11. The system of claim 10, further comprising a generic state machine, the generic state machine comprising the at least one rule.

12. The system of claim 10, wherein the network interface card and the host comprise different interfaces employing different interface types.

13. The system of claim 9, wherein the logic is further adapted to perform at least one of a frame check sequence (FCS) check on the packet and a filter on a medium-access control (MAC) for the packet, wherein if the packet fails the FCS check or MAC filter, the logic discards the packet prior to processing of the packet as the bytestream and executing the set of instructions to apply the at least one filter rule.

14. The system of claim 9, wherein the at least one filter rule comprises at least one byte-defined filter rule.

15. The system of claim 9, wherein the logic is adapted to process the packet as a raw bytestream by dividing the packet into octets and executing the set of instructions to apply the at least one filter rule to the octets of the raw bytestream.

16. An article of manufacture comprising:
  at least one computer readable storage device having computer-readable program code logic to facilitate packet filtering, the computer-readable program code logic when executing on a computer performing the following:
  employing an instruction set of a pseudo-machine in filtering packets received at a network interface card coupled to a host, the pseudo-machine being a generic state machine implementable in any of a plurality of locations, wherein the instruction set is generic, a set of instructions of the instruction set of the pseudo-machine being written as a discrete program which when executing performs the filtering to apply at least one filter rule, wherein the set of instructions is independent of the location in which the pseudo-machine is implemented, the filtering comprising:
    obtaining a packet of the received packets for filtering;
    processing bytes of the packet as a bytestream and executing the set of instructions to apply the at least one filter rule to the bytestream to filter the packet, wherein the executing is performed in any one of a plurality of locations without customization of the generic instruction set, and the pseudo-machine is implementable in any one of the plurality of locations without customization of the generic instruction set, the plurality of locations comprising the network interface card and the host, and the at least one filter rule is implemented the same across any of the plurality of locations; and wherein the processing and executing are performed in a first network interface card coupled to the host for packets received at the first network interface card, and wherein a second network interface card is also coupled to the host, the second network interface card lacking the pseudo-machine, and wherein the processing and executing are performed at the host for packets received at the second network interface card.

17. The article of manufacture of claim 16 wherein when employed in the network interface card, the network interface card further comprises at least one of an offload engine or firewall filtering.

18. The article of manufacture of claim 17, wherein the program implements a generic state machine, the generic state machine comprising the at least one filter rule and processing the packet as a bytestream comprises processing the packet as a raw bytestream divided into octets and executing the set of instructions to apply the at least one filter rule to the octets of the raw bytestream.

19. The article of manufacture of claim 16, wherein the at least one filter rule comprises at least one byte-defined filter rule.

* * * * *